United States Patent
Wolfe et al.

(10) Patent No.: US 11,573,773 B2
(45) Date of Patent: Feb. 7, 2023

(54) METHODS AND SYSTEMS FOR CORRELATING SOURCE CODE COMMITMENTS AND MODEL RESULT RECORDS DURING MODEL DEVELOPMENT

(71) Applicant: Capital One Services, LLC, McLean, VA (US)

(72) Inventors: Joseph Wolfe, McLean, VA (US); Ryan Soley, McLean, VA (US); Michael McCarty, McLean, VA (US); Srilatha Ranganathan, McLean, VA (US); Diane Lee, McLean, VA (US); Brian Blocker, McLean, VA (US); Davis Ford, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/191,060

(22) Filed: Mar. 3, 2021

(65) Prior Publication Data
US 2022/0283786 A1  Sep. 8, 2022

(51) Int. Cl.
G06F 9/44 (2018.01)
G06F 8/34 (2018.01)
G06F 8/71 (2018.01)

(52) U.S. Cl.
CPC . *G06F 8/34* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,721,941 B1* | 4/2004 | Morshed | G06F 11/3612 717/124 |
| 10,402,310 B1* | 9/2019 | Kjellin | G06F 16/13 |
| 2004/0153830 A1* | 8/2004 | Cebula | G06F 11/3688 714/38.14 |
| 2005/0144588 A1* | 6/2005 | White | G06F 11/3664 717/113 |
| 2012/0233599 A1* | 9/2012 | Valdiviezo Basauri | G06F 8/41 717/126 |
| 2014/0109063 A1* | 4/2014 | Schissel | G06F 11/0769 717/127 |
| 2017/0344467 A1* | 11/2017 | Yadav | G06F 11/3664 |
| 2018/0365133 A1* | 12/2018 | Mitchell | G06F 8/60 |
| 2019/0034763 A1* | 1/2019 | Guim Bernat | G06K 9/6257 |
| 2019/0138426 A1* | 5/2019 | Dunn | G06F 11/3608 |
| 2019/0235993 A1* | 8/2019 | Modeel | G06F 8/60 |

* cited by examiner

*Primary Examiner* — Wei Y Zhen
*Assistant Examiner* — Lanny N Ung
(74) *Attorney, Agent, or Firm* — Perkins Coie LLP (57) ABSTRACT

Methods and systems are described herein for improvements to model development, particularly in terms of source code commitments for these models. For example, methods and systems allow contributors to manage when and where commitments and/or the results of those commitments are stored and/or do so without the use of an additional layer of external software by correlating source code commitments and model result records during model development. Moreover, the methods and systems allow contributors to manage when and where commitments are store automatically without the use of an additional layer of external software through user of native source code commands and libraries.

20 Claims, 7 Drawing Sheets

```
In [1]: from rubicon import Rubicon rubicon = Rubicon(persistence="memory", auto_git_enabled=True)  ← 302

In [2]: project = rubicon.create_project("Automatic Git Integration")
        project.github_url Out[2]: 'https://github.cloud.capitalone.com/Rubicon/positron.git'

In [3]: experiment = project.log_experiment(model_name="GitHub Model",  ← 304
        experiment.branch_name, experiment.commit_hash Out[3]: ('master', '2cbee70820d5b61aa766cee77438db46b77d4f78')
```

```python
def _create_experiment_domain(
self, name, description, model_name, branch_name, commit_hash, training_metadata, tags, ):
    if self._config.is_auto_git_enabled:
        if branch_name is None:
            branch_name = self._get_branch_name()          ← 402
        if commit_hash is None:
            commit_hash = self._get_commit_hash()

if training_metadata is not None:
        training_metadata = domain.utils.TrainingMetadata(training_metadata)

return domain.Experiment(
        project_name=self._domain.name,
        name=name,
        description=description,
        model_name=model_name,
        branch_name=branch_name,
        commit_hash=commit_hash,
        training_metadata=training_metadata,
        tags=tags,
```

450

```python
def _get_branch_name(self):
    """Returns the name of the active branch of the `git` repo
    it is called from.
    """
    command = ["git", "rev-parse", "--abbrev-ref", "HEAD"]
    completed_process = subprocess.run(command, capture_output=True)

return completed_process.stdout.decode("utf8").replace("\n", "")

def _get_commit_hash(self):
    """Returns the hash of the last commit to the active branch
    of the `git` repo it is called from.
    """
    command = ["git", "rev-parse", "HEAD"]
    completed_process = subprocess.run(command, capture_output=True)

return completed_process.stdout.decode("utf8").replace("\n", "")
```

```python
def create_experiment(self, experiment):
    """Persist an experiment to the configured filesystem.

Parameters
    ----------
    experiment : rubicon.domain.Experiment
        The experiment to persist.
    """
    experiment_metadata_path = self._get_experiment_metadata_path(
        experiment.project_name, experiment.id
    )

self._persist_domain(experiment, experiment_metadata_path)
```
← 502

530

```python
def _persist_domain(self, domain, path):
    """Persists the Rubicon object `domain` to the local
    path defined by `path`.
    """
    self.filesystem.mkdirs(os.path.dirname(path), exist_ok=True)

with self.filesystem.open(path, "w") as f:
        f.write(json.dumps(domain))
```

```
def update_selected_project(self, selected_project_name):
Parameters
----------
selected_project_name : str
    The name of the project to set as selected and load data for.
"""
self._selected_project, *_ = [p for p in self._projects if p.name == selected_project_name]

grouped_experiment_dfs = self._maybe_run_async(
    self._selected_project.to_dask_df, group_by="commit_hash"
)

et_commit_hash_display_length = 7
et_drop_columns = ["description", "name", "created_at"]
et_type_castings = {"tags": "str"} ec_drop_columns = ["commit_hash", "model_name", "tags"]
ec_index = "id"

# no experiments logged to the project yet
if len(grouped_experiment_dfs.items()) == 0:
    self._experiment_table_dfs = {} for commit_hash, df in grouped_experiment_dfs.items():
    experiment_table_df = df.drop(columns=et_drop_columns)
    experiment_table_df = experiment_table_df.astype(et_type_castings)
    experiment_table_df["commit_hash"] = experiment_table_df["commit_hash"].map(
        lambda ch: ch[:et_commit_hash_display_length] if ch is not None else None
    )
    self._experiment_table_dfs[commit_hash] = experiment_table_df experiment_comparison_df = experiment_table_df.set_index(ec_index)
    experiment_comparison_df = experiment_comparison_df.drop(columns=ec_drop_columns)

self._experiment_comparison_root_dfs[commit_hash] = experiment_comparison_df
```

METHODS AND SYSTEMS FOR CORRELATING SOURCE CODE COMMITMENTS AND MODEL RESULT RECORDS DURING MODEL DEVELOPMENT

BACKGROUND

Computer programming is typically a team-based activity, in which the responsibilities for the features and source code necessary to produce a given project (e.g., a software application) are shared among contributors. To facilitate this activity, contributors may submit contributions to the project via a distributed version control system. This system may include a codebase that features a full history of the project that is mirrored on every contributor's computer. The system may enable automatic management of different branches of the project as well as the merging of different contributions. The system may also utilize one or more issue management and bug-tracking tools. The system may further out-source some issues to software-as-a-service providers. Accordingly, project management for computer programming often involves multiple contributions and service providers sharing multiple versions a single codebase for the project.

SUMMARY

Methods and systems are described herein for improvements to model development, particularly in terms of source code commitments for these models. For example, when a project relates to the development of a model, simulation, and/or other computer process, and especially in projects that may use one or more artificial intelligence based models, contributors may need to not only submit their contributions to a software development version control system, but also review the effects, if any their contribution has on the overall model. These effects may take various forms including the generation of a particular set of results. In addition to simply logging results, the methods and systems provide a mechanism for improving the reproducibility of the model results. For example, one or more contributors may need to review the source code, functions, and/or rule sets that generated a particular set of results and/or modified the model in a particular way.

While conventional systems have developed mechanisms for monitoring models during training, storing models, loading the model in production code, and/or creating a pipeline, these conventional systems rely on an additional layer of external software. This additional layer of external software removes the ability of the contributor to control how, when, and/or what is monitored and/or stored, and in particular where it is stored. For example, conventional systems which may automatically store all commitments result in a mass of updates and/or results that are too numerous to effectively review. If a contributor wishes to monitor a particular commitment and/or its results of the hundreds (or thousands) of commitments for a project, the contributor is forced to manually record data about the commitment (e.g., the time of commitment, the changes, model version, etc.). Similarly, as the conventional approaches organize commitments by project, a contributor must search through not only his/her own commitments, but every other commitment by other contributors to the project.

Accordingly, methods and systems are described herein that allow contributors to manage when and where commitments and/or the results of those commitments are stored and/or do so without the use of an additional layer of external software by correlating source code commitments and model result records during model development. Moreover, the methods and systems allow contributors to manage when and where commitments without the use of an additional layer of external software through use of native source code commands and libraries. For example, by allowing the contributor to hold responsibility for the data and its storage, the contributor may determine when (e.g., what commitments are stored and/or correlated with model results) and where (e.g., local, remote, and/or cloud based drives) the commitments and/or results are stored.

Additionally, by using native source code commands and libraries, the contributors may make these determinations through specific source code commands entered into the code and without the need to access an additional software application and/or exit a currently in use application for the development of the source code. By doing so, the methods and systems not only increase efficiency, but lower the risk of system errors and crashes caused by the interaction of disparate applications—errors and crashes that could cause the irreversible loss of commitments and results. Finally, the methods and systems may present the commitments in an intuitive user interface that links the commitments to the results and/or source code of the commitments.

In some aspects, methods and systems for correlating source code commitments and model result records during model development without use of an additional layer of external software through the use of native source code commands and libraries. For example, the system may receive, at a software development version control system, a first subset of user inputs comprising a first source code commitment for a model development project for a model, wherein the first source code commitment comprises a first storage identifier. The system may execute, at the software development version control system, the model based on the first source code commitment. The system may determine first results of the model based on the first source code commitment. The system may store, based on the first storage identifier, the first results in the software development version control system. The system may generate for simultaneous display, in a user interface for the software development version control system, a first icon and a second icon, wherein selection of the first icon causes a human-readable version of the first source code commitment to be displayed in the user interface, and wherein selection of the second icon causes a human-readable version of the first results to be displayed in the user interface.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 6 shows exemplary pseudocode of storing a source code commitment to a location, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
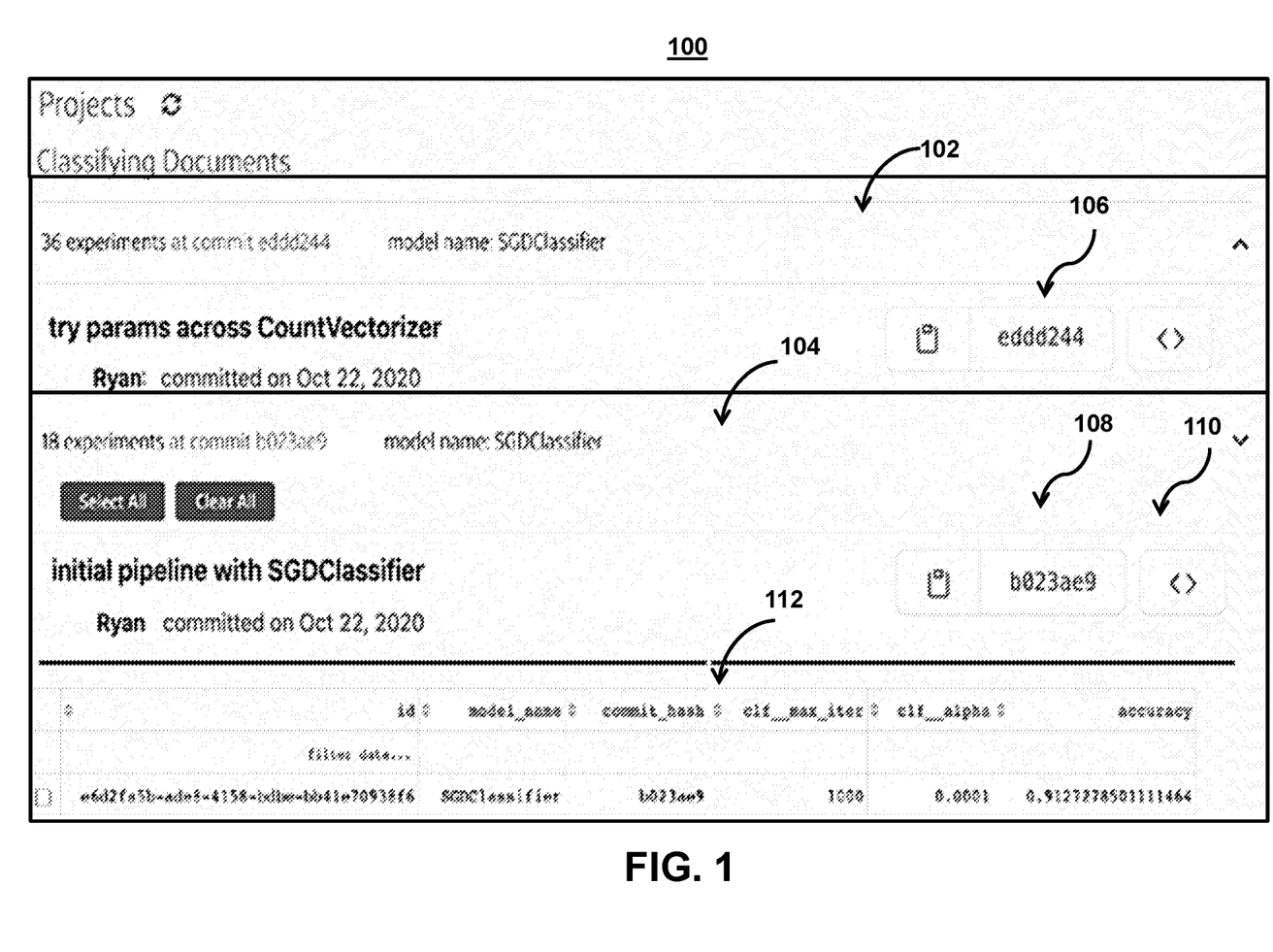
FIG. 1 shows an illustrative user interface for correlating source code commitments and model result records, in accordance with one or more embodiments.

FIG. 1 shows an illustrative user interface for correlating source code commitments and model result records, in accordance with one or more embodiments. For example, FIG. 1 shows user interface 100. User interface 100 may correspond to a user interface generated for display by a software development version control system. The software development version control system may store commitments to one or more software development projects. For example, as shown in user interface 100, the software development version control system currently displays commitment 102 and commitment 104. Commitment 102 and commitment 104 may represent different commitments for different models and/or different categories of commitments for the same model.

For example, user interface 100 may include references to a project (e.g., a source code programming project for a new software application, model, etc.). For that project, user interface 100 may include numerous categories of model components and/or experiments related to the project. In some embodiments, each experiment, result, and/or model component may correspond to a software feature component for a project from an end-user perspective. That is, each of these may relate to features or sub-features and/or functions of the software feature component. In some embodiments, one or more contributions may correspond to one or more projects and/or may further correspond to one or more software development tools. For example, the software development version control system may receive contributions from one or more software development tools. Each software development tool may provide one or more goods or services that furthers a goal of the software development tool. For example, a software development tool may include a software-as-a-service provider, that provides technical management support, such as IT service management, to the IT operations of large corporations, including providing help desk functionality. In another example, the software development tool may include a site that provides social networking-like functions such as feeds, followers, wikis and a social network graph to display how developers work on their versions ("forks") of a repository and what fork (and branch within that fork) is newest. In another example, the software development tool may include a service for hosting code snippets for small and/or large projects. In another example, the software development tool may include a service used for issue tracking and project management.

Commitment 102 and commitment 104 are uniquely identifiable based on hash 106 and hash 108, respectively. For example, the system may generate a commit hash based on a source code commitment. The commit hash may link a given commitment to an experiment run by the model, a branch of the model, and/or results of the model. The system may then store the source code commitment in the software development version control system and link the source code commitment to results in the software development version control system based on the commit hash.

For example, user interface 100 may include results 112, which indicate the results of an experiment run on a model based on a source code commitment. User interface 100 may also include icon 110, which may allow a contributor to navigate user interface 100 and/or present results for different experiments for each model and/or commitment. For example, the plurality of commitments may be filtered based on a user selection requesting the display of a particular commitment, hash, and/or other category. For example, a contributor (e.g., a project manager and/or contributor) may filter the commitments by selecting an icon associated with a particular commitment, hash, and/or other category.

In some embodiments, user interface 100 may generate a recommendation or other media content. For example, the system may generate a recommendation and/or content (e.g., results, source code changes, source code characteristics, etc.) featuring the name of a contributor for a logged experiment. User interface 100 may generate recommendations and/or graphical representations of the recommendations of a given contributor and/or the project based on results, source code changes, source code characteristics. For example, in some embodiments, the software development control system may provide metrics for a given contribution. The metrics may relate one or more improvements to the model or may relate to commitments themselves. For example, the metrics may indicate contributions committed to the software development version control system, unique additions to the software development version control system, deletions submitted to the software development version control system, unique contributions added to the software development version control system, average weekly contributions to the software development version control system, distinct project contributions to the software development version control system, distinct organization contributions to the software development version control system, contribution statistics, number of contribution modifications submitted to the software development version control system, number of contributions added to the software development version control system, number of contributions removed from the software development version control system, number of contributions renamed at the software development version control system, or number of positive reviews of contributions. These metrics may be expressed in a quantitative fashion (e.g., a number contributions committed). Alternatively or additionally, the metrics may be expressed in a qualitative fashion (e.g., "above average", "average", "below average", "good", "bad", etc.).

In some embodiments, user interface 100 may display source code commitments that have not yet been validated. For example, a first source code commitment (e.g., corresponding to commitment 102) may be executed prior to a validation of the first source code commitment by the software development version control system. Additionally or alternatively, a second source code commitment (e.g., corresponding to commitment 104) may be executed prior to a validation of the second source code commitment by the software development version control system. For example, the system may use one or more source code analysis tools, including compilers and static analysis tools, to validate source code as conforming to this coding standard.

Figure 2:
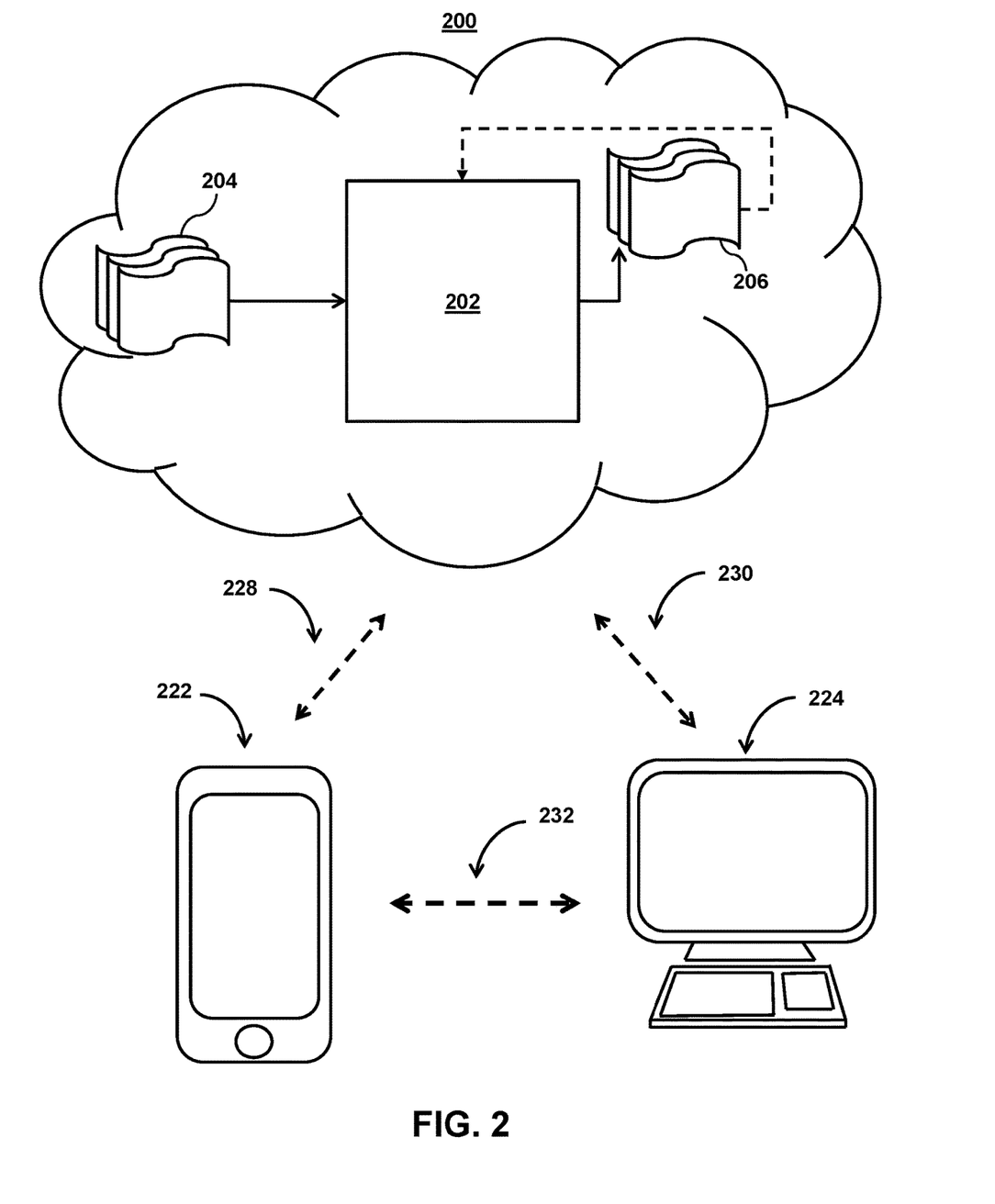
FIG. 2 shows an illustrative system for correlating source code commitments and model result records, in accordance with one or more embodiments.

FIG. 2 shows an illustrative system for a software development version control system, in accordance with one or more embodiments. As shown in FIG. 2, system 200 may include user device 222, user device 224, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 222 and user device 224 may include a desktop computer, a server, or other client device. Users may, for instance, utilize one or more of the user devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of user device 222, those operations may, in some embodiments, be performed by components of user device 224. System 200 also includes database 202, which may be implemented on user device 222 and user device 224, or accessible by communication paths 228 and 230, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 5G or LTE network), a cable network, a public switched telephone network, or other types of communications network or combinations of communications networks. Communication paths 228, 230, and 232 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 2, database 202 may take inputs 204 and provide outputs 206. The inputs may include multiple data sets such as a training data set and a test data set. Each of the plurality of data sets (e.g., inputs 204) may include data subsets of projects and/or data related to one or more projects. Similarly, in some embodiments, outputs 206 may be fed back to database 202 as input to train database 202 (e.g., a model stored on database 202) alone or in conjunction with user indications of the accuracy of outputs 206, labels associated with the inputs, or with other reference feedback information). In another embodiment, database 202 may update its configurations (e.g., weights, biases, or other parameters) based on the assessment of its prediction (e.g., outputs 206) and reference feedback information (e.g., user indication of accuracy, reference labels, or other information). In another embodiment, where database 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the database 202 (or one or more models stored on database 202) may be trained to generate better predictions.

In some embodiments, database 202 may include an artificial neural network, machine learning model, and/or other artificial intelligence based system. In an artificial neural network embodiment, the artificial neural network may include input layer and one or more hidden layers. Each neural unit of the artificial neural network may be connected with many other neural units of the artificial neural network. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. The artificial neural network may be self-learning and trained, rather than explicitly programmed, and can perform significantly better in certain areas of problem solving, as compared to traditional computer programs. During training, an output layer of the artificial neural network may correspond to a classification of the artificial neural network and an input known to correspond to that classification may be input into an input layer of the artificial neural network during training. During testing, an input without a known classification may be input into the input layer, and a determined classification may be output.

In some embodiments, the artificial neural network may include multiple layers (e.g., where a signal path traverses from front layers to back layers). In some embodiments, back propagation techniques may be utilized by the artificial neural network where forward stimulation is used to reset weights on the "front" neural units. In some embodiments, stimulation and inhibition for the artificial neural network may be more free-flowing, with connections interacting in a more chaotic and complex fashion. During testing, an output layer of the artificial neural network may indicate whether or not a given input corresponds to a classification of database 202 (e.g., whether a first length of time corresponds to lengths of programming time for previously completed stories by contributors without a required skill).

Figure 3:
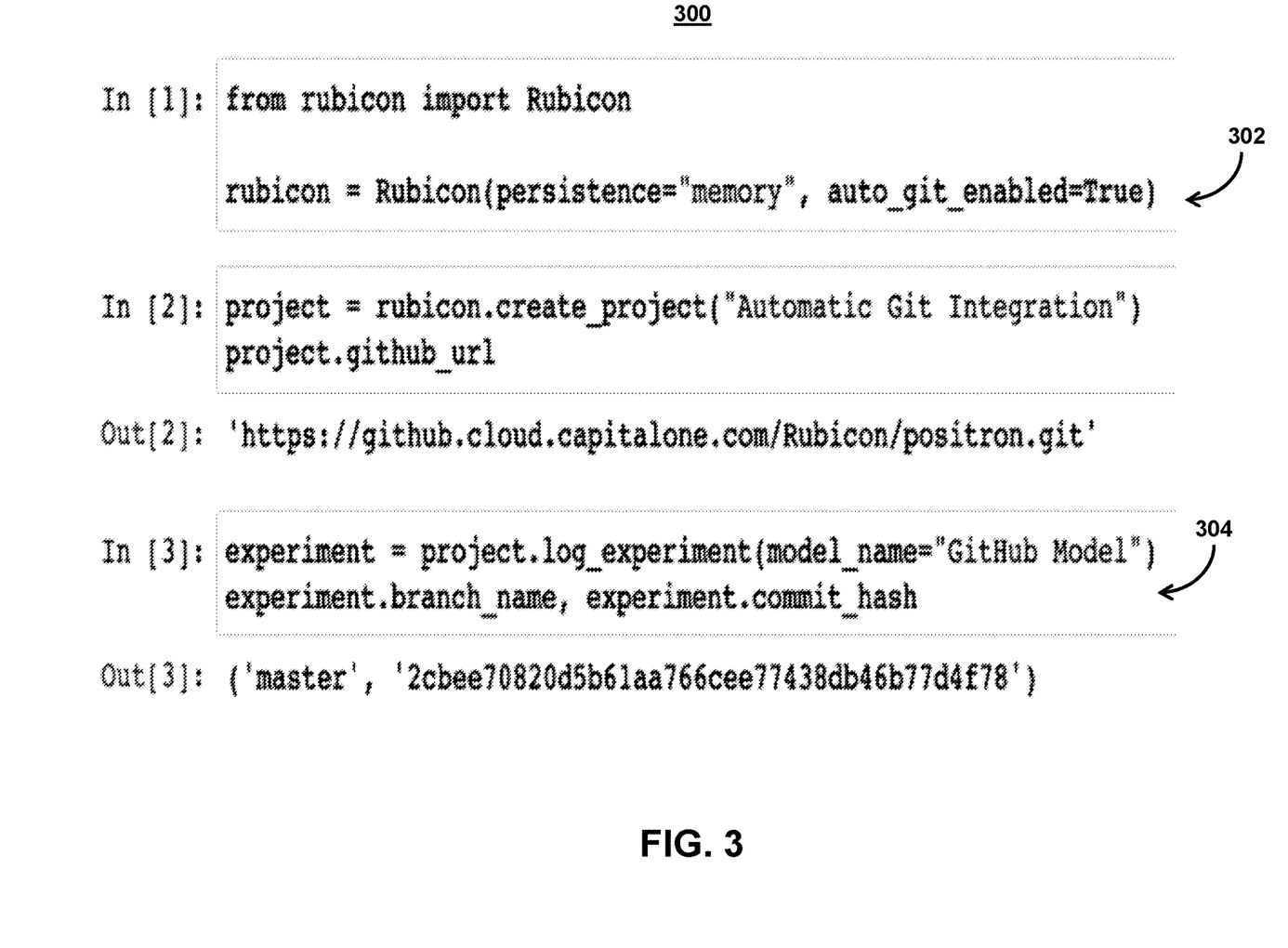
FIG. 3 shows exemplary pseudocode for integrating model code and software development version control system, in accordance with one or more embodiments.

FIG. 3 shows exemplary pseudocode for integrating model code and software development version control system, in accordance with one or more embodiments. For example, FIG. 3 includes pseudocode 300. Pseudocode 300 provides an exemplary manner in which the system may link source code commitments to a software development version control system. In particular, pseudocode 300 provides examples of GitHub integration. It should be noted that the embodiments describe herein may be applied to any software for tracking changes in any set of files, usually used for coordinating work among programmers collaboratively developing source code during software development.

Pseudocode 300 includes item 302 (e.g., "auto_git_enabled=True"), which indicates a source code flag used to automatically enable the software development version control system. Pseudocode 300 includes item 304 (e.g., "project.log_experiment (Model_name="GitHub Model")"), which indicates a categorization (e.g., based on results and/or experiment) for use in logging results. Item 304 may also include a branch name and commit hash, which are tracked automatically on every experiment logged by a contributor. For example, in some embodiments, item 302 and/or item 304 may comprise, or cause the generation of, a storage identifier. A storage identifier may comprise a source code string in the source code commitment that indicates whether and where a commitment should be stored. For example, a storage identifier may comprise any source code string, including command, functions, etc., that may indicate whether or not a result of an experiment is logged and/or where the results are logged. For example, the storage identifier may comprise an experiment name, branch name, and/or commit hash.

In some embodiments, the system may use source code (e.g., Python) that is an interpreted, high-level and general-purpose programming language. The system may use a code with readability (e.g., in order to provide human-readable commitments, results, and/or other information). For example, the system may use a source code language using significant indentation in order to enhance readability. The system may also select a source code language that has language constructs and an object-oriented approach in order to allow contributors to write clear, logical code for small and large-scale projects.

The system may use a source code that is dynamically-typed, garbage-collected, and/or has a comprehensive standard library. For example, a dynamically-typed language is a class of high-level programming languages, which at runtime execute many common programming behaviors that static programming languages perform during compilation. These behaviors may include an extension of the program, by adding new code, by extending objects and definitions, or by modifying the type system. A garbage-collected source code language is one that uses automatic memory management. The garbage collector, or just collector, attempts to reclaim garbage, or memory occupied by objects that are no longer in use by the program.

The system may also select a language that supports multiple programming paradigms, including structured (particularly, procedural), object-oriented and functional programming. For example, the first source code string may be written in Python and indicate whether the first results should be stored on a local device or a remote device. The system may also select a language that may store, based on a storage identifier, the results (e.g., of a logged experiment) in the software development version control system based on instructions in the source code commitment. For example, the system may retrieve a library comprising a common interface (e.g., Pythonic) with an application programming interface that is uniform across Secure Shell network protocols, Hadoop distributed file system protocols, and Simple Storage Service protocols. The system may then determine, based on the library, a storage location for the results based on the storage identifier. The system may then transmit a storage instruction to store first results at the storage location (e.g., a hierarchical file structure).

Figure 4:
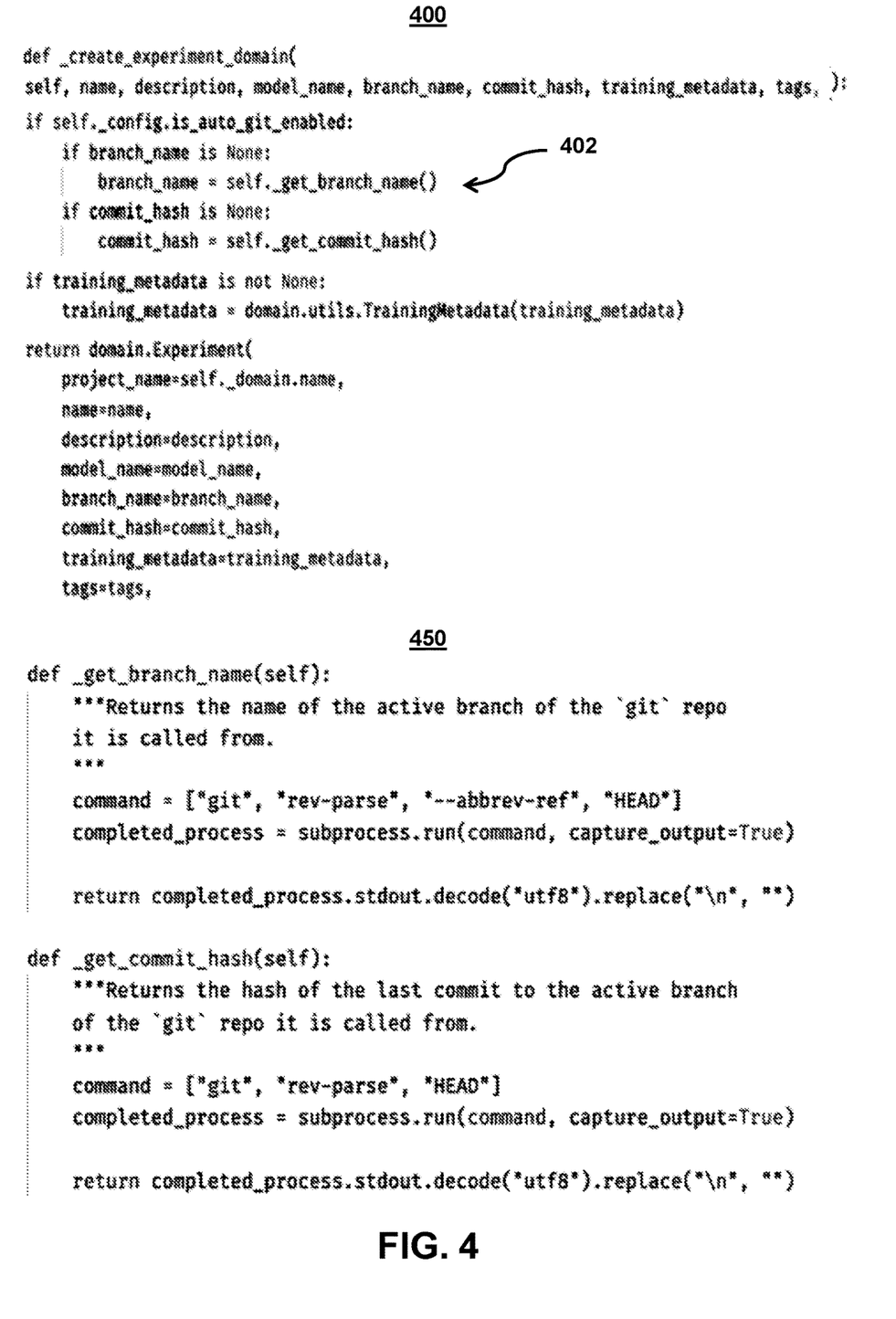
FIG. 4 shows exemplary pseudocode of source code commitment flagged for storage, in accordance with one or more embodiments.

FIG. 4 shows exemplary pseudocode of source code commitment flagged for storage, in accordance with one or more embodiments. For example, FIG. 4 includes pseudocode 400. Pseudocode 400 provides an exemplary manner in which the system may parse source code and identify flags indicating that the results of an experiment should be logged. For example, a flag in the source code may comprise a storage identifier that is an extension for pushing project files to the software development version control system in a predefined interval without taking any action by a developer. Accordingly, the contributor may generate a commitment that is automatically logged and correlated to the results of its experiment.

For example, based on item 402, the system may check if a flag was set on a client device and if so, the system pulls the git information directly from the contributor's working environment using a command-line interface (e.g., a Git command). For example, item 402 is added to the experiment (e.g. via the command-line interface). The system stores the command-line interface response. The system adds the response to the experiment as shown in pseudocode 450. For example, the system may identify a storage identifier in the source code commitment such as item 402. The system may then determine, using a command-line interface of the software development version control system, a first storage location for the first results.

For example, a command-line interface processes commands to a computer program in the form of lines of text (e.g., lines of source code in a commitment). The system may act as a program that handles the interface (e.g., a command-line interpreter or command-line processor). For example, the command-line interface may comprise a structure featuring a prompt, a command, and one or more parameters. A parameter may be an item of information provided to a program when it is started. A program can have many command-line arguments that identify sources or destinations of information, or that alter the operation of the program. For example, potential storage locations, experiments, and/or other information used to correlate and/or log data may be presented as a parameter.

Figure 5:
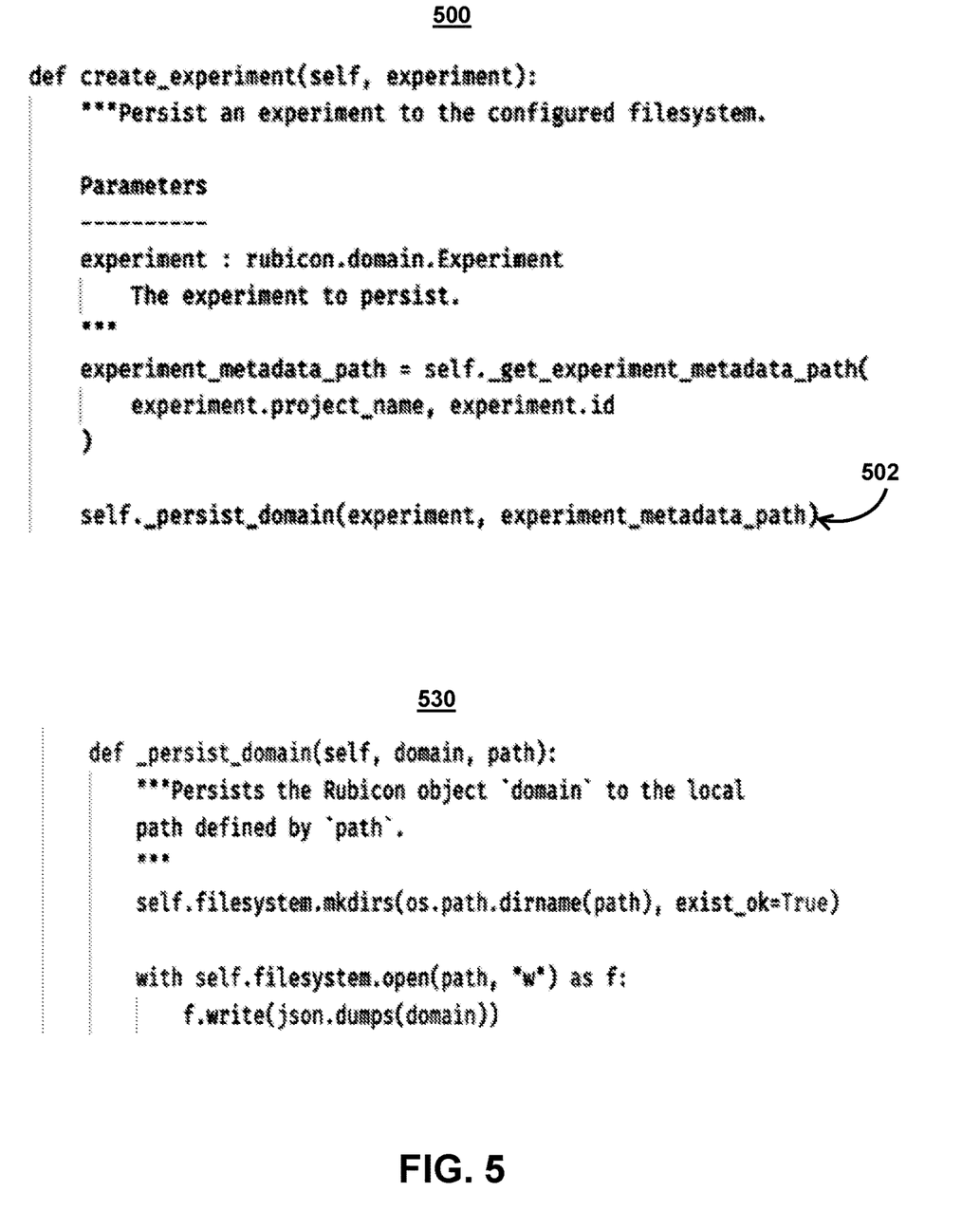
FIG. 5 shows exemplary pseudocode of storing a source code commitment to a location, in accordance with one or more embodiments.

FIG. 5 shows exemplary pseudocode of storing a source code commitment to a location, in accordance with one or more embodiments. For example, FIG. 5 includes pseudocode 500. Pseudocode 500 provides an exemplary manner in which the system may parse source code, identify flags indicating that the results of an experiment should be logged, and select a location for storing the results.

For example, pseudocode 500 includes item 502 (e.g., "self-persist_domain (experiment_metadata_path"). Based on item 502, the system execute pseudocode 530. Pseudocode 530 indicates that the experiment record is persisted to the specified filesystem using Filesystem Spec (FSSPEC). For example, FSSPEC is a project to unify various projects and classes to work with remote filesystems and file-system-like abstractions using a standard pythonic interface. The system may harness these advantages as the commands for logging experiment results and correlating them with commitments is included with the commitment's source code.

For example, the self.filesystem object is an instance of FSSPEC filesystem and used to write the data for persistence. The object may be used to write data to memory, local storage, and/or S3. The results of the experiment are written to the local filesystem.

For example, the system may use an abstract file-system interface as a template for other filesystems such as an API for working with files on the given file-system, which can mean files on some remote store, local files, files within some wrapper, or anything else that is capable of producing file-like objects. The system may thus store and/or log the results of experiments to any of these files. Additionally, the system may provide text-mode and compression on the fly, and the objects can be serialized for passing between processes or machines (so long as each has access to the same backend file-system). The system may determine a protocol (i.e., backend) from the URL passed, and glob characters may be expanded in read mode (search for files) or write mode (create names).

For example, based on item 502 the system may determine a file location for logging an experiment. For example, item 502 may use file-system addressing that is are naturally dict-like (i.e., objects which implements (or emulates) dictionary interfaces). The system may also use key-value mappings in which each (string) path corresponds to some binary data on the storage backend. For example, for some use-cases, it is very convenient to be able to view some path within the file-system as a dict-like store, and the function fsspec.get_mapper( ) gives a one-stop way to return such an object.

Figure 6:
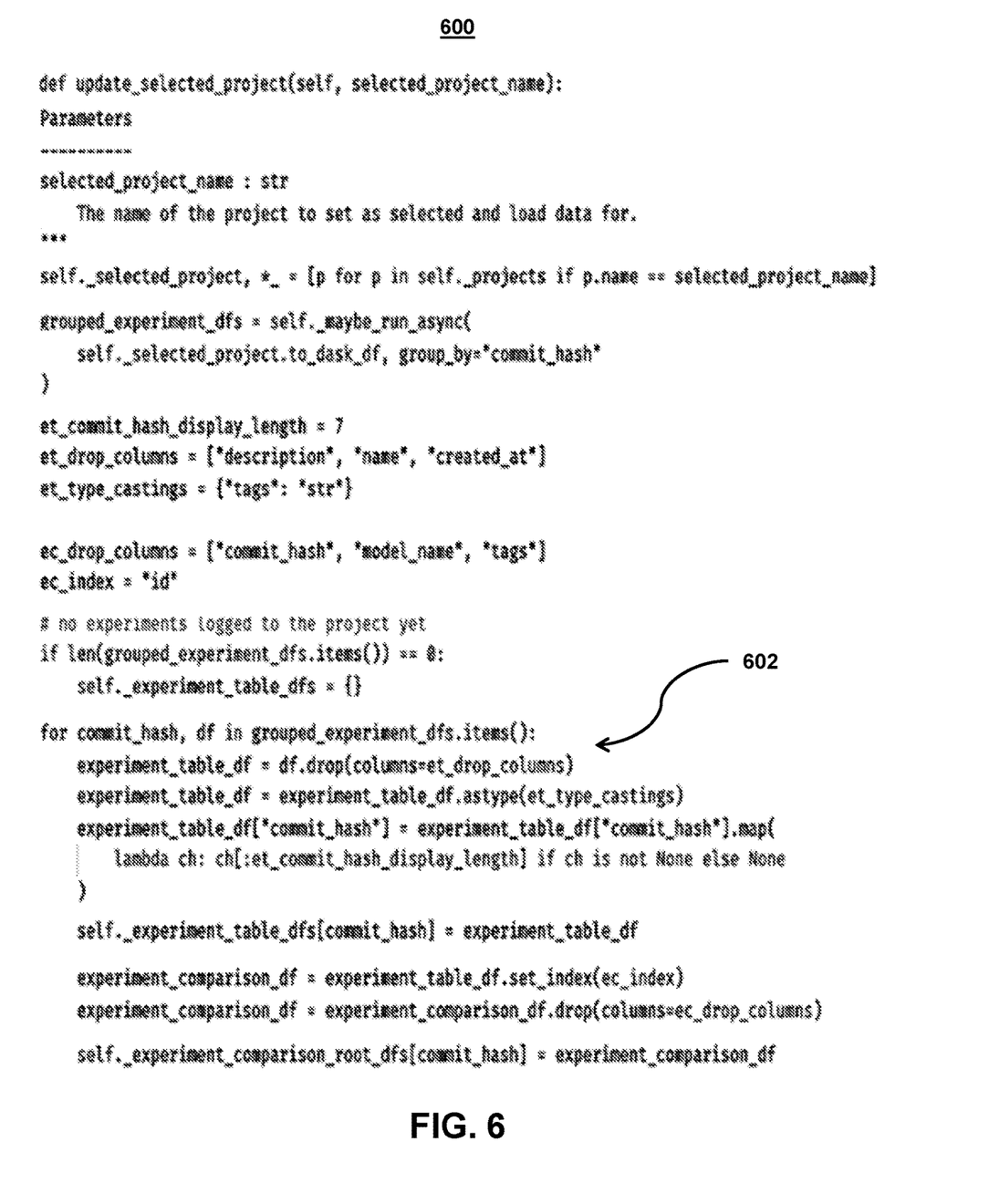
FIG. 6 shows exemplary pseudocode of source code commitments grouped by results, in accordance with one or more embodiments.

FIG. 6 shows exemplary pseudocode of source code commitments grouped by results, in accordance with one or more embodiments. For example, FIG. 6 includes pseudocode 600. Pseudocode 600 provides an exemplary manner in which the system may group experiments by their commit hash (e.g., for display within a dashboard (e.g., user interface 100 (FIG. 1)).

For example, pseudocode 600 may include item 602. The system may execute item 602 to pull the contributor's logged experiments from the filesystem and organize them by commit hash. The system may then use this data to populate a dashboard (e.g., user interface 100 (FIG. 1)) so that contributors may view their experiments grouped by commit. The system may further allow a contributor to directly reference a resulting hash code that was used to log any experiment group with a link (e.g., provided in user interface 100 (FIG. 1)) to a software development version control system.

Figure 7:
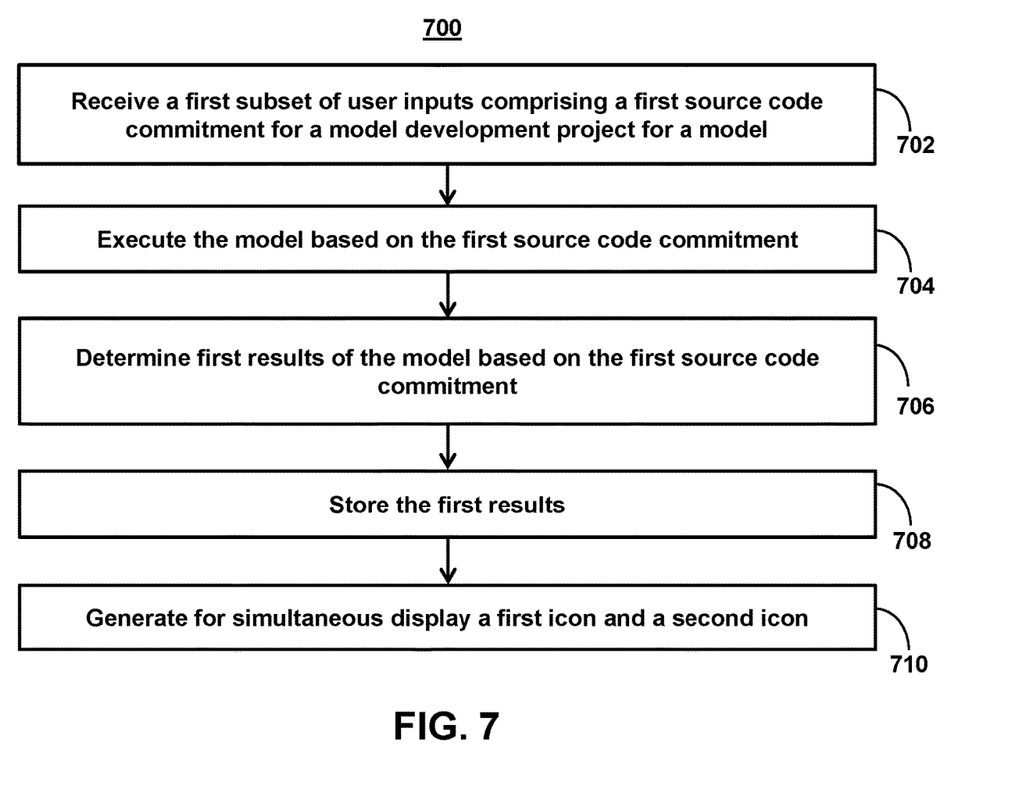
FIG. 7 shows a flowchart of the steps involved in assigning a story to a contributor based on a similarity metric, in accordance with one or more embodiments.

FIG. 7 shows a flowchart of the steps involved in correlating source code commitments and model result records during model development, in accordance with one or more embodiments. For example, process 700 may represent the steps taken by one or more devices as shown in FIGS. 1-2. For example, process 700 may be performed by a software development version control system that includes cloud-based memory configured to store a plurality of stories of a first project and cloud-based control and I/O circuitry. In some embodiments, process 700 may represent the steps taken for correlating source code commitments and model result records during model development without use of an additional layer of external software through the use of native source code commands and libraries.

At step 702, process 700 retrieves (e.g., at a software development version control system and/or using one or more components of system 200) a first subset of user inputs comprising a first source code commitment for a model development project for a model. For example, the system may receive, at a software development version control system, a first subset of user inputs comprising a first source code commitment for a model development project for a model, wherein the first source code commitment comprises a first storage identifier. For example, the source code commitments may be awaiting validation at the software development version control system and during that time a contributor may be able to review the results of a commitment (e.g., on a model experiment). For example, a first source code commitment (e.g., corresponding to commitment 102 (FIG. 1)) may be executed prior to a validation of the first source code commitment by the software development version control system. Additionally or alternatively, a second source code commitment (e.g., corresponding to commitment 104 (FIG. 1)) may be executed prior to a validation of the second source code commitment by the software development version control system. For example, the system may use one or more source code analysis tools, including compilers and static analysis tools, to validate source code as conforming to this coding standard.

The first storage identifier may comprise a first source code string in the first source code commitment. Additionally or alternatively, other source code commitments may include other storage identifiers. For example, a storage identifier may comprise any source code string, including commands, functions, etc., that may indicate whether or not a result of an experiment is logged and/or where the results are logged. For example, the storage identifier may comprise an experiment name, branch name, and/or commit hash.

At step 704, process 700 executes (e.g., at a software development version control system and/or using one or more components of system 200) the model based on the first source code commitment. For example, the system may execute, at the software development version control system, the model based on the first source code commitment. For example, the system may execute computer functions based on the source code. The source code may include both changes to a model (e.g., the commitments to the model) as well as instructions from logging experiments (e.g., experiments based on the model as updated by the commitment).

At step 706, process 700 determines (e.g., at a software development version control system and/or using one or more components of system 200) first results of the model based on the first source code commitment. For example, the system may determine first results of the model based on the first source code commitment. For example, the system may run a model based on the commitment prior to validating the commitment and contributing the commitment to the model.

At step 708, process 700 stores (e.g., at a software development version control system and/or using one or more components of system 200) the first results. For example, the system may store, based on the first storage identifier, the first results in the software development version control system. For example, the system may store, based on the first storage identifier, the first results in the software development version control system based on instruction (e.g., written in Python) in the source code commitment. For example, the system may retrieve a library comprising a common Pythonic interface with an application programming interface that is uniform across Secure Shell network protocols, Hadoop distributed file system protocols, and Simple Storage Service protocols. The system may then determine, based on the library, a first storage location for the first results based on the first storage identifier. The system may then transmit a storage instruction to store the first results at the first storage location.

Alternatively or additionally, the system may identify the first storage identifier in the first source code commitment. The system may then determine, using a command-line interface of the software development version control system, a first storage location for the first results. For example, the system may use item 402 (FIG. 4) to determine where and when to log an experiment related to a commitment.

At step 710, process 700 generates (e.g., at a software development version control system and/or using one or more components of system 200) for simultaneous display a first icon and a second icon. For example, the system may generate for simultaneous display, in a user interface for the software development version control system, a first icon and a second icon, wherein selection of the first icon causes a human-readable version of the first source code commitment to be displayed in the user interface, and wherein selection of the second icon causes a human-readable version of the first results to be displayed in the user interface. For example, the system may generate user interface 100 (FIG. 1)) and the first and second icon may correspond to hash 108 (FIG. 1) and icon 110 (FIG. 1).

Additionally or alternatively, the system may receive and process a second source code commitment (e.g., corresponding to the same or a different model and/or project). For example, the system may receive, at the software development version control system, a second subset of user inputs comprising a second source code commitment for the model development project for the model, wherein the second source code commitment comprises a second storage identifier. The system may execute, at the software development version control system, the model based on the second source code commitment, wherein the second source code commitment is executed prior to a validation of the second source code commitment by the software development version control system. The system may determine second results of the model based on the second source code commitment. The system may store, based on the second storage identifier, the second results in the software development version control system. The system may generate for simultaneous display, in a user interface for the software development version control system, a third icon and a fourth icon, wherein selection of the third icon causes a human-readable version of the second source code commitment to be displayed in the user interface, and wherein selection of the fourth icon causes a human-readable version of the second results to be displayed in the user interface.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving a first subset of user inputs comprising a first source code commitment for a model development project for a model, wherein the first source code commitment comprises a first storage identifier that correlates the first source code commitment and model result records for the first source code commitment during model development without use of an additional layer of external software through the use of native source code commands and libraries.

2. A method, the method comprising receiving a first subset of user inputs comprising a first source code commitment for a model development project for a model, wherein the first source code commitment comprises a first storage identifier; executing the model based on the first source code commitment; determining first results of the model based on the first source code commitment; storing, based on the first storage identifier, the first results in the software development version control system; and generating for simultaneous display, in a user interface for the software development version control system, a first icon and a second icon, wherein selection of the first icon causes a human-readable version of the first source code commitment to be displayed in the user interface, and wherein selection of the second icon causes a human-readable version of the first results to be displayed in the user interface.

3. A method for correlating source code commitments and model result records during model development without use of an additional layer of external software through the use of native source code commands and libraries, the method comprising: receiving, at a software development version control system, a first subset of user inputs comprising a first source code commitment for a model development project for a model, wherein the first source code commitment comprises a first storage identifier; executing, at the software development version control system, the model based on the first source code commitment; determining first results of the model based on the first source code commitment; storing, based on the first storage identifier, the first results in the software development version control system; and generating for simultaneous display, in a user interface for the software development version control system, a first icon and a second icon, wherein selection of the first icon causes a human-readable version of the first source code commitment to be display in the user interface, and wherein selection of the second icon causes a human-readable version of the first results to be display in the user interface.

4. The method of any one of the preceding embodiments, further comprising: receiving, at the software development version control system, a second subset of user inputs comprising a second source code commitment for the model development project for the model, wherein the second source code commitment comprises a second storage identifier; executing, at the software development version control system, the model based on the second source code commitment, wherein the second source code commitment is executed prior to a validation of the second source code commitment by the software development version control system; determining second results of the model based on the second source code commitment; storing, based on the second storage identifier, the second results in the software development version control system; generating for simultaneous display, in a user interface for the software development version control system, a third icon and a fourth icon, wherein selection of the third icon causes a human-readable version of the second source code commitment to be displayed in the user interface, and wherein selection of the fourth icon causes a human-readable version of the second results to be displayed in the user interface.

5. The method of any one of the preceding embodiments, wherein the first source code commitment is executed prior to a validation of the first source code commitment by the software development version control system, and wherein the second source code commitment is executed prior to a validation of the second source code commitment by the software development version control system.

6. The method of any one of the preceding embodiments, wherein the first storage identifier comprises a first source code string in the first source code commitment, and wherein the second storage identifier comprises a second source code string in the second source code commitment.

7. The method of any one of the preceding embodiments, wherein the first source code string is written in Python and indicates whether the first results should be stored on a local device or a remote device, and the second source code string is written in Python and indicates whether the second results should be stored on the local device or the remote device.

8. The method of any one of the preceding embodiments, wherein storing, based on the first storage identifier, the first results in the software development version control system, comprises: retrieving a library comprising a common Pythonic interface with an application programming interface that is uniform across Secure Shell network protocols, Hadoop distributed file system protocols, and Simple Storage Service protocols; determining, based on the library, a first storage location for the first results based on the first storage identifier; and transmitting a storage instruction to store the first results at the first storage location.

9. The method of any one of the preceding embodiments, wherein storing, based on the first storage identifier, the first results in the software development version control system, comprises: identifying the first storage identifier in the first source code commitment; and determining, using a command-line interface of the software development version control system, a first storage location for the first results.

10. The method of any one of the preceding embodiments, wherein the first storage identifier comprises an extension for pushing project files to the software development version control system in a predefined interval without taking any action by a developer.

11. The method of any one of the preceding embodiments, wherein the first storage identifier comprises a file system object that identifies a first storage location for the first results.

12. The method of any one of the preceding embodiments, further comprising: generating a commit hash based on the first source code commitment; storing the first source code commitment in the software development version control system; and linking the first source code commitment to the first results in the software development version control system based on the commit hash.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

What is claimed is:

1. A system for correlating source code commitments and model result records during model development without use of an additional layer of external software through the use of native source code commands and libraries, comprising:
cloud-based memory configured to store, for a software development version control system, a plurality of source code commitments for a model development project for a model;
cloud-based control circuitry configured to:
receive, at a software development version control system, a first subset of user inputs comprising a first source code commitment for a model development project for a model, wherein the first source code commitment comprises a first storage identifier, wherein the first storage identifier comprises a first source code string in the first source code commitment, wherein the first source code commitment comprises a plurality of lines of source code for updating the model, and wherein the first storage identifier is located within the plurality of lines of source code;
execute, at the software development version control system, the model based on the first source code commitment, wherein the first source code commitment is executed prior to a validation of the first source code commitment by the software development version control system;
determine first results of the model based on the first source code commitment;
store, based on the first storage identifier, the first results in the software development version control system;
receive, at the software development version control system, a second subset of user inputs comprising a second source code commitment for the model development project for the model, wherein the second source code commitment comprises a second storage identifier;
execute, at the software development version control system, the model based on the second source code commitment, wherein the second source code commitment is executed prior to a validation of the second source code commitment by the software development version control system;
determine second results of the model based on the second source code commitment;
store, based on the second storage identifier, the second results in the software development version control system; and
cloud-based I/O circuitry configured to generate for simultaneous display, in a user interface for the software development version control system, a first icon, a second icon, a third icon, and a fourth icon, wherein selection of the first icon causes a human-readable version of the first source code commitment to be displayed in the user interface, wherein selection of the second icon causes a human-readable version the first results to be displayed in the user interface, wherein selection of the third icon causes a human-readable version of the second source code commitment to be displayed in the user interface, and wherein selection of the fourth icon causes a human-readable version of the second results to be displayed in the user interface.

2. A method for correlating source code commitments and model result records during model development without use of an additional layer of external software through the use of native source code commands and libraries, the method comprising:

receiving, at a software development version control system, a first subset of user inputs comprising a first source code commitment for a model development project for a model, wherein the first source code commitment comprises a first storage identifier, wherein the first storage identifier comprises a first source code string in the first source code commitment, wherein the first source code commitment comprises a plurality of lines of source code for updating the model, and wherein the first storage identifier is located within the plurality of lines of source code;

executing, at the software development version control system, the model based on the first source code commitment;

determining first results of the model based on the first source code commitment;

storing, based on the first storage identifier, the first results in the software development version control system; and generating for simultaneous display, in a user interface for the software development version control system, a first icon and a second icon, wherein selection of the first icon causes a human-readable version of the first source code commitment to be displayed in the user interface, and wherein selection of the second icon causes a human-readable version of the first results to be displayed in the user interface.

3. The method of claim 2, further comprising:

receiving, at the software development version control system, a second subset of user inputs comprising a second source code commitment for the model development project for the model, wherein the second source code commitment comprises a second storage identifier;

executing, at the software development version control system, the model based on the second source code commitment, wherein the second source code commitment is executed prior to a validation of the second source code commitment by the software development version control system;

determining second results of the model based on the second source code commitment;

storing, based on the second storage identifier, the second results in the software development version control system;

generating for simultaneous display, in a user interface for the software development version control system, a third icon and a fourth icon, wherein selection of the third icon causes a human-readable version of the second source code commitment to be displayed in the user interface, and wherein selection of the fourth icon causes a human-readable version of the second results to be displayed in the user interface.

4. The method of claim 3, wherein the first source code commitment is executed prior to a validation of the first source code commitment by the software development version control system, and wherein the second source code commitment is executed prior to a validation of the second source code commitment by the software development version control system.

5. The method of claim 3, wherein the second storage identifier comprises a second source code string in the second source code commitment.

6. The method of claim 5, wherein the first source code string is written in Python and indicates whether the first results should be stored on a local device or a remote device, and the second source code string is written in Python and indicates whether the second results should be stored on the local device or the remote device.

7. The method of claim 2, wherein storing, based on the first storage identifier, the first results in the software development version control system, comprises:

retrieving a library comprising a common Pythonic interface with an application programming interface that is uniform across Secure Shell network protocols, Hadoop distributed file system protocols, and Simple Storage Service protocols;

determining, based on the library, a first storage location for the first results based on the first storage identifier; and transmitting a storage instruction to store the first results at the first storage location.

8. The method of claim 2, wherein storing, based on the first storage identifier, the first results in the software development version control system, comprises:

identifying the first storage identifier in the first source code commitment; and determining, using a command-line interface of the software development version control system, a first storage location for the first results.

9. The method of claim 2, wherein the first storage identifier comprises an extension for pushing project files to the software development version control system in a predefined interval without taking any action by a developer.

10. The method of claim 2, wherein the first storage identifier comprises a file system object that identifies a first storage location for the first results.

11. The method of claim 2, further comprising:

generating a commit hash based on the first source code commitment;

storing the first source code commitment in the software development version control system; and linking the first source code commitment to the first results in the software development version control system based on the commit hash.

12. A non-transitory computer-readable medium for correlating source code commitments and model result records during model development without use of an additional layer of external software through the use of native source code commands and libraries comprising instructions that, when executed by one or more processors, cause operations comprising:

receiving, at a software development version control system, a first subset of user inputs comprising a first source code commitment for a model development project for a model, wherein the first source code commitment comprises a first storage identifier, wherein the first storage identifier comprises a first source code string in the first source code commitment, wherein the first source code commitment comprises a plurality of lines of source code for updating the model, and wherein the first storage identifier is located within the plurality of lines of source code;

executing, at the software development version control system, the model based on the first source code commitment;

determining first results of the model based on the first source code commitment;

storing, based on the first storage identifier, the first results in the software development version control system; and generating for simultaneous display, in a user interface for the software development version control system, a first icon and a second icon, wherein selection of the first icon causes a human-readable version of the first source code commitment to be displayed in the user interface, and wherein selection of the second icon causes a human-readable version of the first results to be displayed in the user interface.

13. The non-transitory computer readable medium of claim 12, wherein the instructions further cause operations comprising:

receiving, at the software development version control system, a second subset of user inputs comprising a second source code commitment for the model development project for the model, wherein the second source code commitment comprises a second storage identifier;

executing, at the software development version control system, the model based on the second source code commitment, wherein the second source code commitment is executed prior to a validation of the second source code commitment by the software development version control system;

determining second results of the model based on the second source code commitment;

storing, based on the second storage identifier, the second results in the software development version control system;

generating for simultaneous display, in a user interface for the software development version control system, a third icon and a fourth icon, wherein selection of the third icon causes a human-readable version of the second source code commitment to be displayed in the user interface, and wherein selection of the fourth icon causes a human-readable version of the second results to be displayed in the user interface.

14. The non-transitory computer readable medium of claim 13, wherein the first source code commitment is executed prior to a validation of the first source code commitment by the software development version control system, and wherein the second source code commitment is executed prior to a validation of the second source code commitment by the software development version control system.

15. The non-transitory computer readable medium of claim 13, wherein the second storage identifier comprises a second source code string in the second source code commitment.

16. The non-transitory computer readable medium of claim 15, wherein the first source code string is written in Python and indicates whether the first results should be stored on a local device or a remote device, and the second source code string is written in Python and indicates whether the second results should be stored on the local device or the remote device.

17. The non-transitory computer readable medium of claim 12, wherein storing, based on the first storage identifier, the first results in the software development version control system, comprises:

retrieving a library comprising a common Pythonic interface with an application programming interface that is uniform across Secure Shell network protocols, Hadoop distributed file system protocols, and Simple Storage Service protocols;

determining, based on the library, a first storage location for the first results based on the first storage identifier; and transmitting a storage instruction to store the first results at the first storage location.

18. The non-transitory computer readable medium of claim 12, wherein storing, based on the first storage identifier, the first results in the software development version control system, comprises:

identifying the first storage identifier in the first source code commitment; and determining, using a command-line interface of the software development version control system, a first storage location for the first results.

19. The non-transitory computer readable medium of claim 12, wherein the first storage identifier comprises an extension for pushing project files to the software development version control system in a predefined interval without taking any action by a developer.

20. The non-transitory computer readable medium of claim 12, wherein the instructions further cause operations comprising:

generating a commit hash based on the first source code commitment;

storing the first source code commitment in the software development version control system; and linking the first source code commitment to the first results in the software development version control system based on the commit hash.

* * * * *